United States Patent
Mandava et al.

(10) Patent No.: US 12,099,388 B2
(45) Date of Patent: Sep. 24, 2024

(54) TEMPERATURE-BASED RUNTIME VARIABILITY IN VICTIM ADDRESS SELECTION FOR PROBABILISTIC SCHEMES FOR ROW HAMMER

(71) Applicant: Intel Corporation, Santa Clara, CA (US)

(72) Inventors: Sreenivas Mandava, Los Altos, CA (US); Anders Fogh, Luenen (DE)

(73) Assignee: Intel Corporation, Santa Clara, CA (US)

( * ) Notice: Subject to any disclaimer, the term of this patent is extended or adjusted under 35 U.S.C. 154(b) by 762 days.

(21) Appl. No.: 17/130,686

(22) Filed: Dec. 22, 2020

(65) Prior Publication Data

US 2021/0109577 A1 Apr. 15, 2021

(51) Int. Cl.
*G06F 1/20* (2006.01)
*G06F 12/02* (2006.01)
*G06F 13/16* (2006.01)

(52) U.S. Cl.
CPC ............ *G06F 1/206* (2013.01); *G06F 12/023* (2013.01); *G06F 13/1668* (2013.01); *G06F 2212/1032* (2013.01)

(58) Field of Classification Search
CPC .... G06F 1/206; G06F 12/023; G06F 13/1668; G06F 2212/1032
See application file for complete search history.

(56) References Cited

U.S. PATENT DOCUMENTS

| | | | |
|---|---|---|---|
| 2008/0037779 A1* | 2/2008 | Seman, Jr. .......... | H02J 7/00047 380/46 |
| 2011/0123022 A1* | 5/2011 | Oishi ...................... | G06F 7/588 380/46 |
| 2014/0156923 A1* | 6/2014 | Bains ................ | G11C 11/40611 711/106 |
| 2014/0281206 A1* | 9/2014 | Crawford .......... | G11C 11/40611 711/106 |
| 2017/0031656 A1* | 2/2017 | Mukhopadhyay ...... | G06F 7/588 |
| 2019/0066759 A1* | 2/2019 | Nale ................. | G11C 11/40618 |
| 2020/0278385 A1* | 9/2020 | Matsubara ............... | G06N 7/01 |

* cited by examiner

*Primary Examiner* — Henry Tsai
*Assistant Examiner* — Harry Z Wang
(74) *Attorney, Agent, or Firm* — Akona IP PC (57) ABSTRACT

A probabilistic scheme that uses temperature to reload an LFSR at runtime introduces randomness to prevent row hammer attacks. In one example, a memory controller includes input/output (I/O) interface circuitry to receive memory access requests from a processor. A linear feedback shift register (LFSR) in the memory controller is shifted in response to receipt of a memory access request to a target address. The shift register is compared a value in the LFSR with a pre-determined value. If the value in the LFSR is equal to the predetermined value, a refresh is triggered to one or more neighboring addresses of the target address. The LFSR is reloaded with one of multiple seeds based on a temperature (for example, from an on-die thermal sensor, a DIMM sensor, and/or other temperature). Selecting one of multiple seeds based on temperature on the fly makes the scheme unpredictable and robust against row hammer.

22 Claims, 5 Drawing Sheets

TEMPERATURE-BASED RUNTIME VARIABILITY IN VICTIM ADDRESS SELECTION FOR PROBABILISTIC SCHEMES FOR ROW HAMMER

FIELD

Descriptions are generally related to computer memory systems, and more particular descriptions are related to mitigation of data loss due to row hammer events.

BACKGROUND

As computer devices continue to decrease in size and increase in capacity and capability, the minimum device geometries used to manufacture the components continues to decrease. The decreases in device geometries enables continued system scaling by enabling improved performance with lower power consumption. However, the decreasing geometries create component-level issues. For example, the decreasing geometries that enable memories to increase in capacity and access speeds exacerbate row hammer or row disturb issues. "Row hammer" refers to repeated access to a target row (the aggressor) within a time period that can result in data loss in a neighboring row (the victim).

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing at least one implementation of the invention that includes one or more particular features, structures, or characteristics. Thus, phrases such as "in one embodiment" or "in an alternate embodiment" appearing herein describe various embodiments and implementations of the invention, and do not necessarily all refer to the same embodiment. However, they are also not necessarily mutually exclusive.

Descriptions of certain details and implementations follow, including a description of the figures, which may depict some or all of the embodiments described below, as well as discussing other potential embodiments or implementations of the inventive concepts presented herein.

DETAILED DESCRIPTION

Using temperature in victim address selection for probabilistic schemes for row hammer can add runtime variability. As DRAM is scaled to greater densities, an excessive number of activates to a single row of a DRAM within a refresh window can corrupt data in adjacent rows (referred to as victim rows). These multiple activates to the same row may result in a victim row being "hammered." For example, capacitance can leak in the victim row due to accesses in rows adjacent to the victim row. The hammering of the victim row due to accesses to adjacent rows is referred to as a "row hammer." The number of row activates to cause an error is referred to as the DRAM's row hammer limit. To reduce the probability of data corruption due to row hammer, a memory system typically includes logic to prevent or mitigate row hammer errors in the memory controller, DRAM, or both.

There are a variety of techniques for preventing or mitigating row hammer. One technique involves a probabilistic scheme that uses an LFSR (linear feedback shift register) and its state transitions to determine if an address for a transaction issued to the memory controller will be treated as a row hammer aggressor address. In one such probabilistic scheme, the LFSR is seeded at CPU reset; after the reset, the behavior of the LFSR is deterministic for a given sequence of commands to the memory controller. Predictability in the LFSR's behavior may allow creating memory traffic that can significantly reduce the effectiveness of the probabilistic nature of the scheme and exploit a DRAM's susceptibility to row hammer.

In contrast, a probabilistic scheme that uses temperature to reload the LFSR at runtime introduces randomness to prevent row hammer attacks. In one example, a memory controller includes input/output (I/O) interface circuitry to receive memory access requests from a processor. A linear feedback shift register (LFSR) in the memory controller is shifted in response to receipt of a memory access request to a target address. The value in the LFSR is compared with a pre-determined value. If the value in the LFSR is equal to the predetermined value, a refresh is triggered to one or more neighboring addresses of the target address. The LFSR is reloaded with one of multiple seeds based on a temperature (for example, from an on-die thermal sensor, a DIMM sensor, and/or other temperature). Selecting one of multiple seeds based on temperature on the fly makes the scheme unpredictable and robust against row hammer.

Figure 1:
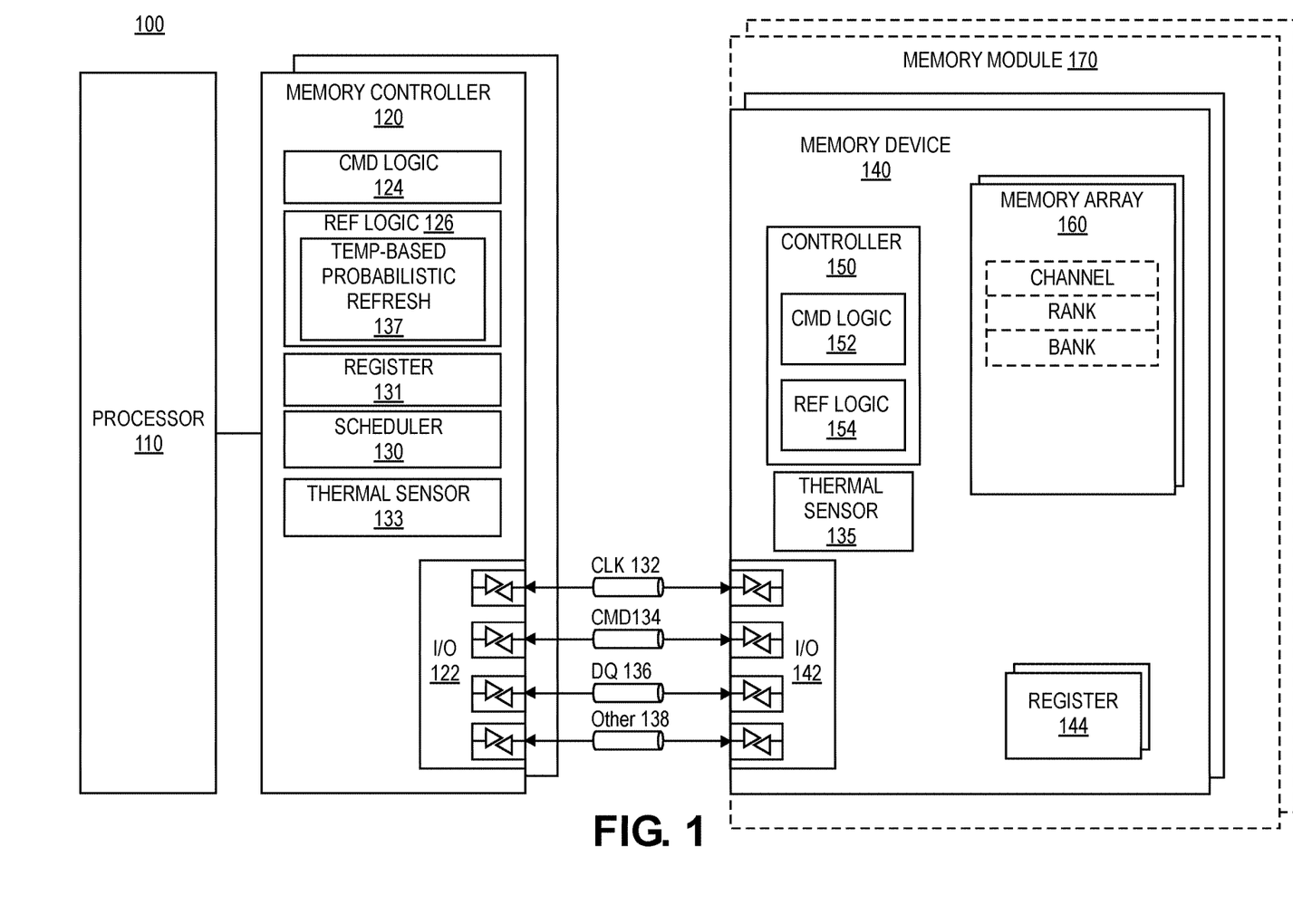
FIG. 1 is a block diagram of an example of a memory subsystem in which a probabilistic refresh scheme can be implemented.

FIG. 1 is a block diagram of an example of a memory subsystem in which a probabilistic row hammer scheme can be implemented. The system 100 includes a processor and elements of a memory subsystem in a computing device.

The processor 110 represents a processing unit of a computing platform that may execute an operating system (OS) and applications, which can collectively be referred to as the host or the user of the memory. The OS and applications execute operations that result in memory accesses. The processor 110 can include one or more separate processors. Each separate processor can include a single processing unit, a multicore processing unit, or a combination. The processing unit can be a primary processor such as a CPU (central processing unit), a peripheral processor such as a GPU (graphics processing unit), or a combination. Memory accesses may also be initiated by devices such as a network controller or hard disk controller. Such devices can be integrated with the processor in some systems or attached to the processer via a bus (e.g., PCI express), or a combination. The system 100 can be implemented as an SOC (system on a chip), or be implemented with standalone components. The system of FIG. 1 is one example of a system in which a probabilistic row hammer scheme can be implemented. Other systems with different or additional components may implement a probabilistic row hammer scheme. For example, any system with a memory controller could implement the techniques described herein (e.g., multi-tenant FPGAs with attached DRAM, or other systems with memory controller logic).

Reference to memory devices can apply to different memory types. Memory devices often refers to volatile memory technologies. Volatile memory is memory whose state (and therefore the data stored on it) is indeterminate if power is interrupted to the device. Nonvolatile memory refers to memory whose state is determinate even if power is interrupted to the device. Dynamic volatile memory requires refreshing the data stored in the device to maintain state. One example of dynamic volatile memory includes DRAM (dynamic random access memory), or some variant such as synchronous DRAM (SDRAM). A memory subsystem as described herein may be compatible with a number of memory technologies, such as DDR4 (double data rate (DDR) version 4, JESD79-4, originally published in September 2012 by JEDEC (Joint Electron Device Engineering Council)), LPDDR4 (low power DDR version 4, JESD209-4, originally published by JEDEC in August 2014), WIO2 (Wide I/O 2 (WideIO2), JESD229-2, originally published by JEDEC in August 2014), HBM (high bandwidth memory DRAM, JESD235A, originally published by JEDEC in November 2015), DDR5 (DDR version 5, currently in discussion by JEDEC), LPDDR5 (LPDDR version 5, JESD209-5, originally published by JEDEC in February 2019), HBM2 ((HBM version 2), currently in discussion by JEDEC), or others or combinations of memory technologies, and technologies based on derivatives or extensions of such specifications.

In addition to, or alternatively to, volatile memory, in one example, reference to memory devices can refer to a non-volatile memory device whose state is determinate even if power is interrupted to the device. In one example, the nonvolatile memory device is a block addressable memory device, such as NAND (not AND) or NOR (not OR) technologies. A memory device can also include a future generation nonvolatile devices, such as a three dimensional crosspoint memory device, or other byte addressable nonvolatile memory devices. A memory device can include a nonvolatile, byte addressable media that stores data based on a resistive state of the memory cell, or a phase of the memory cell. In one example, the memory device can use chalcogenide phase change material. In one example, the memory device can be or include multi-threshold level NAND flash memory, NOR flash memory, single or multi-level phase change memory (PCM) or phase change memory with a switch (PCMS), a resistive memory, nanowire memory, ferroelectric transistor random access memory (FeTRAM), magnetoresistive random access memory (MRAM) memory that incorporates memristor technology, or spin transfer torque (STT)-MRAM, or a combination of any of the above, or other memory.

The memory controller 120 represents one or more memory controller circuits or devices for the system 100. In one example, the memory controller 120 is part of host processor 110, such as logic implemented on the same die or implemented in the same package space as the processor. The memory controller 120 represents control logic that generates memory access commands in response to the execution of operations by the processor 110. The memory controller 120 accesses one or more memory devices 140. The memory devices 140 can be DRAM devices in accordance with any referred to above. In one example, the memory devices 140 are organized and managed as different channels, where each channel couples to buses and signal lines that couple to multiple memory devices in parallel. Each channel is independently operable. Thus, each channel is independently accessed and controlled, and the timing, data transfer, command and address exchanges, and other operations are separate for each channel. Coupling can refer to an electrical coupling, communicative coupling, physical coupling, or a combination of these. Physical coupling can include direct contact. Electrical coupling includes an interface or interconnection that allows electrical flow between components, or allows signaling between components, or both. Communicative coupling includes connections, including wired or wireless, that enable components to exchange data.

The memory controller 120 includes registers 131. The registers 131 represent one or more storage devices or storage locations that provide configuration or settings for the operation of the memory device. In one example, the registers 131 include one or more registers that can be initialized or otherwise programmed to enable and configure the temperature-based victim selection for row hammer refresh described herein. In one example, one or more registers store a value indicative of an on-die temperature (e.g., from an on-die thermal sensor 133). In one example, settings for each channel are controlled by separate mode registers or other register settings. In one example, each memory controller 120 manages a separate memory channel, although system 100 can be configured to have multiple channels managed by a single controller, or to have multiple controllers on a single channel.

The memory controller 120 includes I/O interface logic 122 to couple to a memory bus, such as a memory channel as referred to above. The I/O interface logic 122 (as well as I/O interface logic 142 of memory device 140) can include pins, pads, connectors, signal lines, traces, or wires, or other hardware to connect the devices, or a combination of these. The I/O interface logic 122 can include a hardware interface. As illustrated, the I/O interface logic 122 includes at least drivers/transceivers for signal lines. Commonly, wires within an integrated circuit interface couple with a pad, pin, or connector to interface signal lines or traces or other wires between devices. The I/O interface logic 122 can include drivers, receivers, transceivers, or termination, or other circuitry or combinations of circuitry to exchange signals on the signal lines between the devices. The exchange of signals includes at least one of transmit or receive. While shown as coupling the I/O 122 from memory controller 120 to the I/O 142 of the memory device 140, it will be understood that in an implementation of the system 100 where groups of memory devices 140 are accessed in parallel, multiple memory devices can include I/O interfaces to the same interface of the memory controller 120. In an implementation of the system 100 including one or more memory modules 170, the I/O 142 can include interface hardware of the memory module in addition to interface hardware on the memory device itself. Other memory controllers 120 will include separate interfaces to other memory devices 140.

The bus between memory controller 120 and memory devices 140 can be implemented as multiple signal lines coupling memory controller 120 to memory devices 140. The bus may typically include at least clock (CLK) 132, command/address (CMD) 134, and write data (DQ) and read data (DQ) 136, and zero or more other signal lines 138. In one example, a bus or connection between memory controller 120 and memory can be referred to as a memory bus. In one example, the memory bus is a multi-drop bus. The signal lines for CMD can be referred to as a "C/A bus" (or ADD/CMD bus, or some other designation indicating the transfer of commands (C or CMD) and address (A or ADD) information) and the signal lines for write and read DQ can be referred to as a "data bus." In one example, independent channels have different clock signals, C/A buses, data buses, and other signal lines. It will be understood that in addition to the lines explicitly shown, a bus can include at least one of strobe signaling lines, alert lines, auxiliary lines, or other signal lines, or a combination.

The memory devices 140 represent memory resources for system 100. In one example, each memory device 140 is a separate memory die. In one example, each memory device 140 can interface with multiple (e.g., 2) channels per device or die. Each memory device 140 includes I/O interface logic 142, which has a bandwidth determined by the implementation of the device (e.g., x16 or x8 or some other interface bandwidth). The I/O interface logic 142 enables the memory devices to interface with the memory controller 120. I/O interface logic 142 can include a hardware interface, and can be in accordance with the I/O 122 of the memory controller, but at the memory device end.

In one example, memory devices 140 are disposed directly on a motherboard or host system platform (e.g., a PCB (printed circuit board) on which processor 110 is disposed) of a computing device. In one example, memory devices 140 can be organized into memory modules 170. In one example, memory modules 170 represent dual inline memory modules (DIMMs). In one example, memory modules 170 represent other organization of multiple memory devices to share at least a portion of access or control circuitry, which can be a separate circuit, a separate device, or a separate board from the host system platform. Memory modules 170 can include multiple memory devices 140, and the memory modules can include support for multiple separate channels to the included memory devices disposed on them. In another example, memory devices 140 may be incorporated into the same package as memory controller 120, such as by techniques such as multi-chip-module (MCM), package-on-package, through-silicon via (TSV), or other techniques or combinations. Similarly, in one example, multiple memory devices 140 may be incorporated into memory modules 170, which themselves may be incorporated into the same package as memory controller 120. It will be appreciated that for these and other implementations, the memory controller 120 may be part of the host processor 110.

The memory devices 140 each include one or more memory arrays 160. The memory array 160 represents addressable memory locations or storage locations for data. Typically, the memory array 160 is managed as rows of data, accessed via wordline (rows) and bitline (individual bits within a row) control. The memory array 160 can be organized as separate channels, ranks, and banks of memory. Channels may refer to independent control paths to storage locations within memory devices 140. Ranks may refer to common locations across multiple memory devices (e.g., same row addresses within different devices) in parallel. Banks may refer to sub-arrays of memory locations within a memory device 140. In one example, banks of memory are divided into sub-banks with at least a portion of shared circuitry (e.g., drivers, signal lines, control logic) for the sub-banks, allowing separate addressing and access. It will be understood that channels, ranks, banks, sub-banks, bank groups, or other organizations of the memory locations, and combinations of the organizations, can overlap in their application to physical resources. For example, the same physical memory locations can be accessed over a specific channel as a specific bank, which can also belong to a rank. Thus, the organization of memory resources will be understood in an inclusive, rather than exclusive, manner.

In one example, the memory devices 140 include one or more registers 144. The register 144 represents one or more storage devices or storage locations that provide configuration or settings for the operation of the memory device. In one example, the register 144 can provide a storage location for memory device 140 to store data for access by memory controller 120 as part of a control or management operation. In one example, the registers 144 include one or more Mode Registers. In one example, the registers 144 include one or more multipurpose registers. The configuration of locations within the registers 144 can configure the memory device 140 to operate in different "modes," where command information can trigger different operations within memory device 140 based on the mode. Additionally or in the alternative, different modes can also trigger different operation from address information or other signal lines depending on the mode. Settings of register 144 can indicate configuration for I/O settings (e.g., timing, termination or ODT (on-die termination), driver configuration, or other I/O settings).

In one example, the registers 144 include one or more registers that indicate a temperature of the memory device 140, the memory module 170, or both. For example, the register value can be indicative of a temperature of the memory device 140 or memory module 170 based on one or more thermal sensors on the memory device 140 or memory module 170 (e.g., the thermal sensor 135). It can also indicate the temperature of thermal sensor 133 on the processor or memory controller, temperature of one or more dies for stacked memory dies, a case temperature, or any other memory subsystem or system temperature. The controller 150 of the memory device 140 can sample the temperature from the thermal sensor and store a value representing the temperature, a range of temperatures, a temperature gradient, a change in temperature, or some other temperature information based on the reading of the thermal sensor. In one example, the thermal sensor(s) are sampled at regular intervals and the register storing temperature information can be updated at regular intervals. In another example, a thermal event (such as a temperature reaching or exceeding a threshold temperature) may trigger the register to be updated.

The memory device 140 includes the controller 150, which represents control logic within the memory device to control internal operations within the memory device. For example, the controller 150 decodes commands sent by memory controller 120 and generates internal operations to execute or satisfy the commands. The controller 150 can be referred to as an internal controller, and is separate from memory controller 120 of the host. The controller 150 can determine what mode is selected based on the registers 144, and configure the internal execution of operations for access to the memory resources 160 or other operations based on the selected mode. The controller 150 generates control signals to control the routing of bits within the memory device 140 to provide a proper interface for the selected mode and direct a command to the proper memory locations or addresses. The controller 150 includes command logic 152, which can decode command encoding received on command and address signal lines. The command logic 152 can be or include a command decoder. With the command logic 152, memory device can identify commands and generate internal operations to execute requested commands.

Referring again to the host memory controller 120, the memory controller 120 includes command (CMD) logic 124, which represents logic or circuitry to generate commands to send to the memory devices 140. The generation of the commands can refer to the command prior to scheduling, or the preparation of queued commands ready to be sent. Generally, the signaling in memory subsystems includes address information within or accompanying the command to indicate or select one or more memory locations where the memory devices should execute the command. In response to scheduling of transactions for the memory device 140, the memory controller 120 can issue commands via the I/O 122 to cause the memory device 140 to execute the commands. In one example, the controller 150 of memory device 140 receives and decodes command and address information received via I/O 142 from the memory controller 120. Based on the received command and address information, the controller 150 can control the timing of operations of the logic and circuitry within the memory device 140 to execute the commands. The controller 150 is responsible for compliance with standards or specifications within the memory device 140, such as timing and signaling requirements. The memory controller 120 can implement compliance with standards or specifications by access scheduling and control.

The memory controller 120 includes scheduler 130, which represents logic or circuitry to generate and order transactions to send to memory device 140. From one perspective, the primary function of the memory controller 120 could be said to schedule memory access and other transactions to the memory device 140. Such scheduling can include generating the transactions themselves to implement the requests for data by the processor 110 and to maintain integrity of the data (e.g., such as with commands related to refresh). The transactions can include one or more commands, and result in the transfer of commands or data or both over one or multiple timing cycles such as clock cycles or unit intervals. Transactions can be for access such as read or write or related commands or a combination, and other transactions can include memory management commands for configuration, settings, data integrity, or other commands or a combination.

The memory controller 120 includes refresh (REF) logic 126. The refresh logic 126 can be used for memory resources that are volatile and need to be refreshed to retain a deterministic state. In one example, the refresh logic 126 indicates a location for refresh, and a type of refresh to perform. The refresh logic 126 can trigger self-refresh within the memory device 140 or execute external refreshes (which can be referred to as auto refresh commands) by sending refresh commands, or a combination. In one example, the controller 150 within the memory device 140 includes refresh logic 154 to apply refresh within the memory device 140. In one example, the refresh logic 154 generates internal operations to perform refresh in accordance with an external refresh received from the memory controller 120. The refresh logic 154 can determine if a refresh is directed to memory device 140, and what memory resources 160 to refresh in response to the command.

In addition, refreshes may be performed to prevent or mitigate row hammer. In the example illustrated in FIG. 1, the refresh logic 126 includes logic 137 to implement a temperature-based probabilistic refresh scheme. In one example, a probabilistic refresh scheme involves identifying an address (e.g., a row address) of a memory write or activation as an aggressor by comparing a pseudo-random number (e.g., a subset or all the bits of a value in a shift register) to a pre-determined value (e.g., a subset or all the bits of the pre-determined value). When there is a match between the value in the shift register and the pre-determined value, the target address is identified as an aggressor and refreshes to the neighboring addresses can be issued. In this example, one or more temperatures are used to determine which seed is used to reload the LFSR in the probabilistic scheme.

Figure 2:
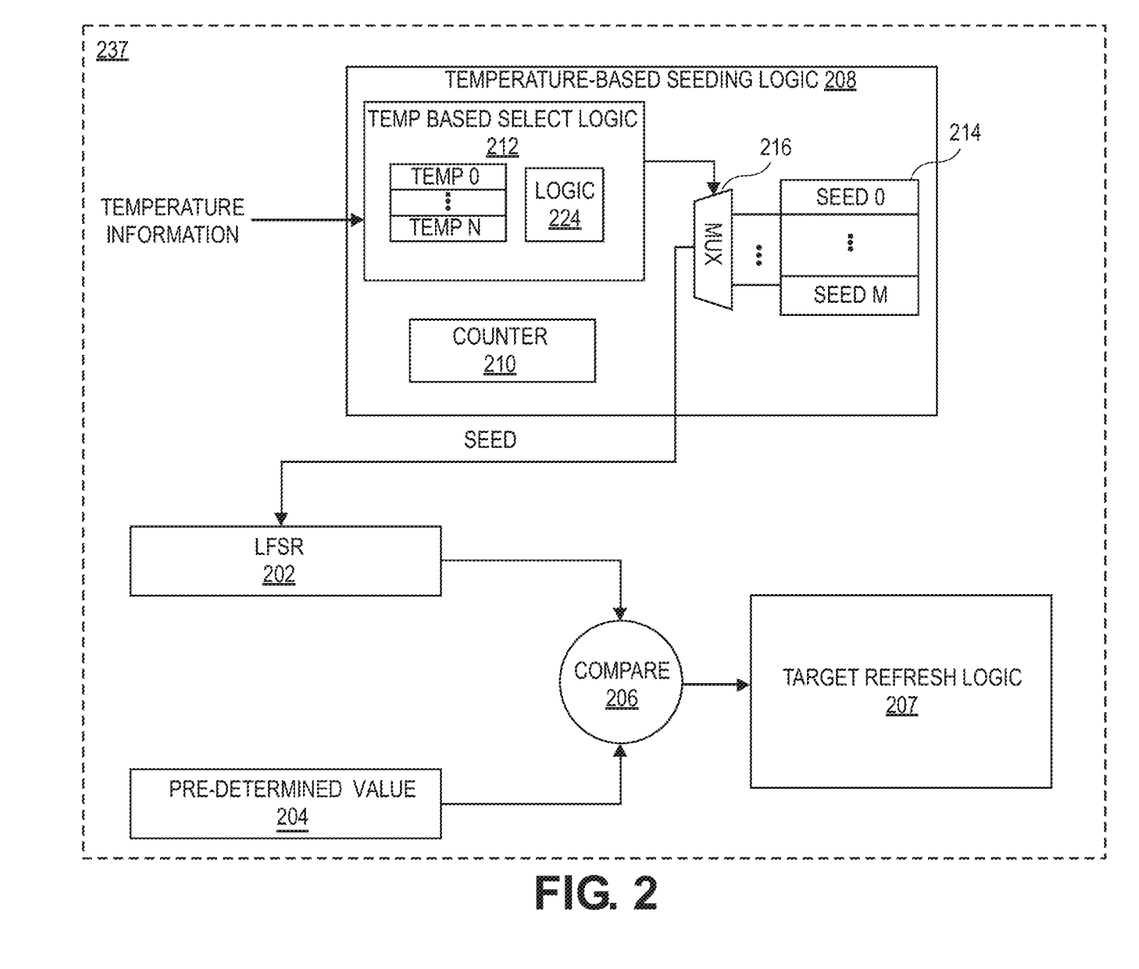
FIG. 2 illustrates an example of probabilistic refresh logic using temperature to select a value for reloading the LFSR.

FIG. 2 illustrates an example of probabilistic refresh logic using temperature to select a value for reloading the LFSR. The refresh logic 237 of FIG. 2 is included in a memory controller, such as the memory controller 120 of FIG. 1. For example, the temperature-based probabilistic refresh logic 137 of FIG. 1 may be or include the logic 237 of FIG. 2. In one example, channel circuitry for each channel includes the logic 237.

The logic 237 includes a linear feedback shift register (LFSR) 202 to generate a pseudo-random number. In one example, the LFSR 202 has a characteristic primitive polynomial defined by the position of the XORs in the feedback path. In one example, the LFSR 202 shifts or increments in response to the receipt of each valid memory access request or command received by the memory controller. The logic 237 also includes a register 204 to store a pre-determined value for comparison with a value in the LFSR 202. In one example, the size (e.g., number of bits) of the LFSR 202 and the size of the value in the register 204 are chosen jointly so that the target refresh logic probabilistically refreshes frequently enough to avoid memory corruption while minimizing refresh penalties. A high rate of refresh gives a higher probability that there will be no data corruption, but at a higher cost in terms of penalties associated with refresh.

The compare logic 206 receives a value from the LFSR (some or all of the bits stored in the LFSR) and the pre-determined value (some or all of the bits of the predetermined value) and compares the received values. The compare logic 206 may be or include one or more comparator circuits that output a signal to indicate whether the received values are equal. If the value from the LFSR 202 is equal to the pre-determined value 204, the memory command is treated as an attacker, and the output signal from the compare logic 206 triggers a refresh to neighboring addresses. For example, in response to the match, the target refresh logic 207 determines victim addresses neighboring the target address and triggers refreshes to those victim addresses.

In probabilistic refresh schemes that use an LFSR to generate a pseudo-random number, the LFSR may be seeded in a variety of ways such as at CPU reset by firmware. However, seeding the LFSR at CPU reset without runtime reseeding has disadvantages. For example, secure firmware (such as micro-code or p-code) can read a digital random number generator (DRNG) on the CPU as part of a reset sequence and seed the LFSR using the value of the DRNG. While reseeding the LFSR at reset enables boot-to-boot variation in the LFSR's behavior, systems in data centers may be seldom rebooted and the LFSR's behavior would remain predictable for the duration of each boot.

In another example, firmware could read the DRNG mentioned above and periodically re-seed the LFSR at runtime. However, requiring firmware to reseed the LFSR at runtime is expensive for firmware routines (e.g., due to the large number of memory controllers to be programmed over the message channel interface). Additionally, requiring firmware to reseed the LFSR on the memory controller forces support of a feature that is intrinsic to the memory controller from agents (e.g., firmware) outside the memory controller.

In contrast, the logic 237 implements a technique to use temperature as a factor to continuously re-seed the LFSR at runtime, and thus add unpredictability in the victim address selection of the LFSR while maintaining the effectiveness of the scheme. The logic 237 includes temperature-based seeding logic 208 that selects a seed based at least in part on temperature information, such as DIMM temperature information or on-die temperature information. The logic 208 includes one or more registers (or other memory or storage) 214 to store multiple seeds (e.g., seeds 0-M). The logic 208 stores at least two seeds in the registers 214 but may store more than two seed values (e.g., 3, 4, tens, hundreds, etc.). The seeds 214 are initialized with non-zero values at boot or reset. In one example, each of the seeds is a different non-zero value. For example, the BIOS (basic input output system), firmware, or software can generate random non-zero seed values at system boot or reset and cause the seed values to be stored in the memory controller. In one example, the seed values remain static during runtime and are only updated at boot or reset. In another example, the firmware or software updates the seed values during runtime.

The logic 208 includes a free-running counter 210 to trigger selection of one of the seeds 214 and reloading of the LFSR 202. A multiplexor (MUX) 216 selects one of the seeds 214 based on a select input from temperature-based select logic 212. The temperature based-select logic 212 receives temperature information and outputs a select signal to the MUX 216 based on the temperature information. The MUX 216 may represent one or multiple multiplexors. The temperature information can include one or more temperatures or values indicative of temperature (e.g., Temp 0-Temp N). The temperature based select logic 212 includes logic 224 that performs logic operations (such as one or more of XOR, XNOR, AND, OR, NOR, NAND, inversion, etc.) to the one or more temperature values. The temperature-based select logic 212 can also generate a select signal based on other bits in addition to temperature. For example, the select signal can be generated based on one or more bits from the LFSR in addition to temperature. Using temperature to select a seed to reload the LFSR with improves the effectiveness of the probabilistic scheme to do victim selection even for traffic patterns that rely on the LFSR's predictable state transitions to create row hammer attack patterns.

Figure 3:
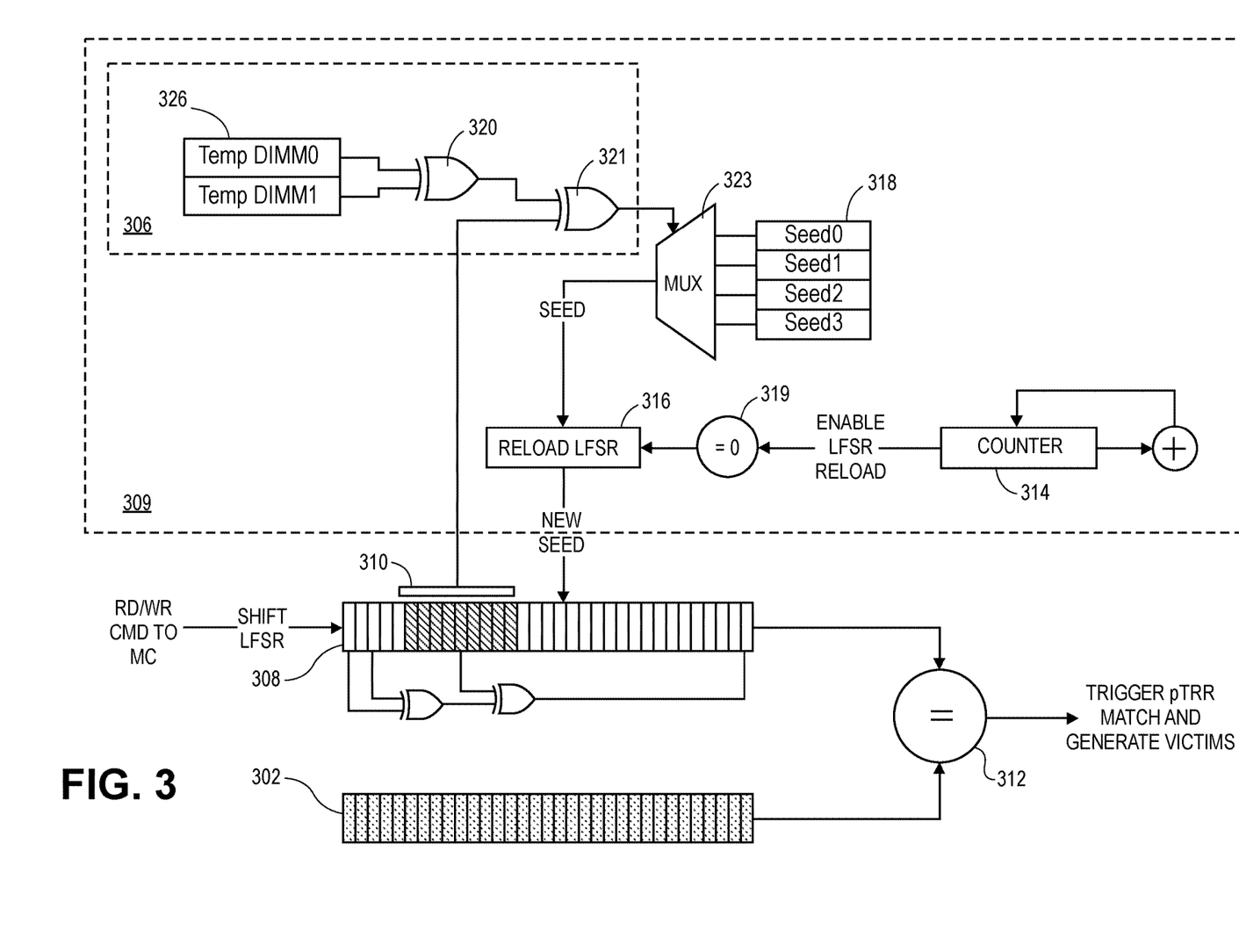
FIG. 3 illustrates an example of probabilistic refresh logic using temperature to select a value for reloading the LFSR.

FIG. 3 illustrates an example of probabilistic refresh logic using temperature to select a value for reloading the LFSR. Like FIG. 2, the logic of FIG. 3 includes two register 302 and 308 that are compared to determine when to treat an incoming memory command as an attacker. The register 308 is a LFSR that shifts in response to receipt of a memory command at the memory controller. The XOR gates shown on feedback paths for the LFSR are non-limiting examples. The register 302 stores a pre-programmed value, like the register 204 of FIG. 2. Comparator logic 312 compares the pre-programmed value stored in the register 302 with the value stored in the LFSR 308 (or at least a subset of the bits in the registers 302 and 308). When there is a match in the compared values, the incoming memory command is treated as an attacker, and the target address as an aggressor address.

The example in FIG. 3 also includes circuitry 309 to re-load or re-initialize the LFSR 308 at runtime. In the illustrated example, one of four seeds 318 is selected based on a select signal from temperature-based select logic 306 (which can be the same as or similar to the temp based select logic 212 of FIG. 2). In this example, two temperature values 326 are inputs to the XOR (exclusive OR) gate 320. In the illustrated example two temperature values from two different channels or DIMMs is used. In one example, the temperature of each DIMM on a memory channel from the DIMM's on-die temperature sensor (TSOD) is continuously read (e.g., by the memory controller over an SPD (serial presence detect) interface) and written to registers in the memory controller. In one such example, the memory controller already reads the DIMM's on-die temperatures for other features, such as for throttling traffic to the DIMM based on DIMM temperature.

The two temperature values are XOR'ed and the result is output to the input of a second XOR gate 321. The XOR gate 321 receives the output of the XOR gate 320 and one or more bits 310 from the LFSR 308. The XOR with the existing bits in the LFSR 308 allows for additional variance in the seed selection. The output of the second XOR gate 321 provides the select input for the multiplexor 323. One of the seeds 318 is selected based on the select signal from the temperature-based select logic 306. The width of the XOR buses depends on the number of seeds available to select from. For example, two seeds may be selected with one select input, four seeds may be selected with two select inputs, etc.

Thus, a seed for reloading the LFSR 308 is selected based on at least one value indicative of temperature. As mentioned above, the select logic 306 may generate an output signal based on one temperature value, two temperature values, or more than two temperature values. The temperature values may be from the memory (e.g., DIMM temperatures) or from one or more on-die thermal sensors for the memory controller and/or processor (e.g., CPU on-die temperature sensors close to the memory subsystem). The output signal from the select logic 306 may also be based on other values, such as a subset of bits from the current values stored in the LFSR.

The logic 309 includes a free running counter or timer 314 to determine how frequently the LFSR should be reinitialized. In one example, each time the counter reaches 0 or another predetermined count (based on the comparator logic 319), logic to reload the LFSR picks a seed from the seeds 318 to initialize the LFSR 308. The counter 314 can then be reset to a pre-determined count and count down again to zero. In another example, the counter counts up to a pre-determined count (e.g., from zero). The example of FIG. 3 illustrates an example in which the counter counts up to a pre-determined count by incrementing the count with an adder ("+"). In some examples, the count or time that the counter runs for can be programmable (e.g., via a register) and modified during run-time.

Thus, the value loaded into the LFSR affects the injection probability of victim refreshes. Using temperature allows non-deterministic selection of the seed each time the LFSR is reinitialized and changes the subsequent sequence of the row hammer aggressor selection. The interval to reinitialize the LFSR can be controlled by selecting an appropriate width and clocking scheme for the counter.

Figure 4:
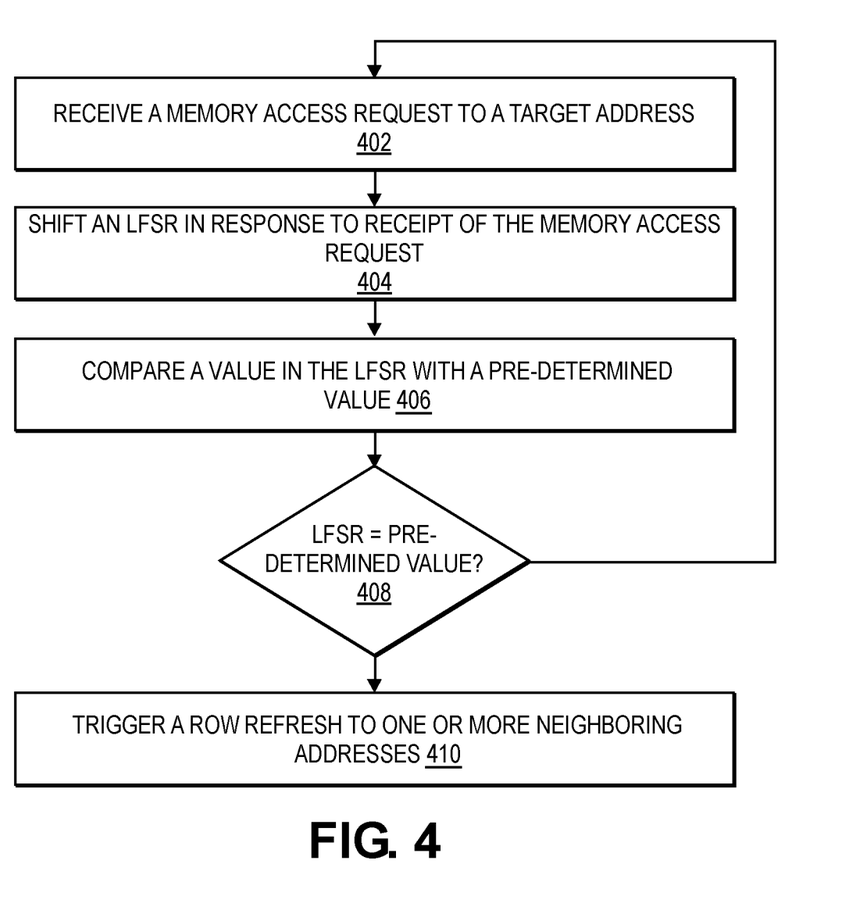
FIG. 4 is a flow chart of an example of a method for performing a probabilistic row hammer refresh scheme.
Figure 5:
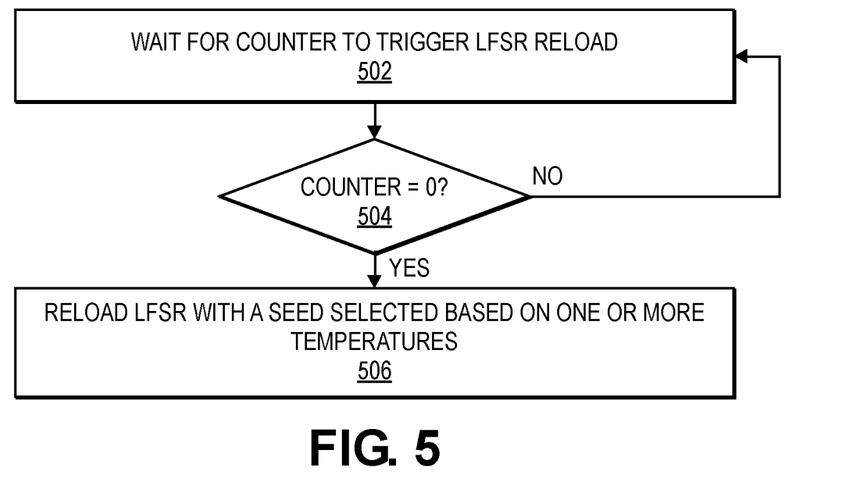
FIG. 5 is a flow chart of an example of a method for performing a probabilistic row hammer refresh scheme.

FIGS. 4 and 5 are flow charts of examples of methods for performing a probabilistic row hammer refresh scheme. The methods of FIGS. 4 and 5 may be performed by logic in the memory controller. In one example, the methods described in FIGS. 4 and 5 are implemented with circuitry (e.g., logic gates, transistors, registers, resistors, capacitors, etc.). Some logic involved in the techniques described may also or alternatively be implemented in firmware or software. For example, as mentioned above, the BIOS of a system may initialize settings via writes to registers (e.g., to store random values in the LFSR and register to hold the pre-determined value with which the LFSR is to be compared, counter-related settings, and/or temperature-related settings).

Referring to FIG. 4, the method of FIG. 4 is an example of a method for performing a probabilistic row hammer refresh scheme.

The method starts with receiving a memory access request to a target address, at 402. For example, referring to FIG. 1, a memory controller 120 may receive a memory access request from the processor 110 or other requester. The memory access request may be, for example, a memory read, memory write, or other memory access request. In response to receipt of the memory access request, the LFSR used in the logic for determining which addresses are to be treated as aggressors is shifted, at 404. For example, referring to FIG. 2, the LFSR 202 is shifted in response to the memory controller receiving a memory access request.

The value stored in the LFSR is compared with a pre-determined value, at 406. For example, referring to FIG. 2, comparator circuitry 206 compares the value stored in the LFSR 202 with the pre-determined value 204. All or some of the bits stored in the LFSR and the register 204 can be compared. If the LFSR (or subset of bits from the LFSR) is not equal to the pre-determined value (or subset of the pre-determined value), 408 NO branch, the method starts again at block 402. If the LFSR (or subset of bits from the LFSR) is equal to the pre-determined value (or subset of the pre-determined value), 408 YES branch, a refresh to one or more neighboring addresses is triggered, at 410. For example, referring to FIG. 2, the output of the comparator circuitry 206 is sent to logic 207, which determines the target address of the last request is to be treated as an aggressor. The logic 207 the determines one or more neighboring addresses to the aggressor address and causes refreshes to be sent to those neighboring addresses.

FIG. 5 is an example of a method to reload the LFSR referred to in the method of FIG. 4 using temperature. Thus, in one example, the methods of FIGS. 4 and 5 are performed in a memory controller in parallel. The method of FIG. 5 starts with waiting for a counter to trigger reload of the LFSR used in the logic for determining which addresses are to be treated as aggressors, at 502. FIG. 5 shows in an example of a counter that counts down from an initial value. If the counter does not equal zero, 504 NO branch, the reloading logic continues to wait, at 502. If the counter equals zero, 504 YES branch, the LFSR is reloaded with a seed selected based on one or more temperatures, at 506. For example, referring to FIG. 3, the reload logic 316 waits for a signal from the counter 314 to cause the LFSR 308 to be reloaded. Reloading the LFSR involves storing a new value in the LFSR. When the reload logic 316 receives a signal indicating the counter interval has passed, the reload logic 316 receives a seed from the output of the multiplexor 323. The seed output by the multiplexor 323 is selected based on the output of select logic 306. The select logic 306 outputs the select signal based on one or more values indicative of temperature.

Thus, a probabilistic row hammer refresh scheme that uses temperature to reload the LFSR adds runtime variability to row hammer victim address selection. This can significantly improve the effectiveness of a probabilistic scheme to perform victim selection even for traffic patterns that rely on an LFSR's predictable state transitions to create row hammer attack patterns.

Figure 6:
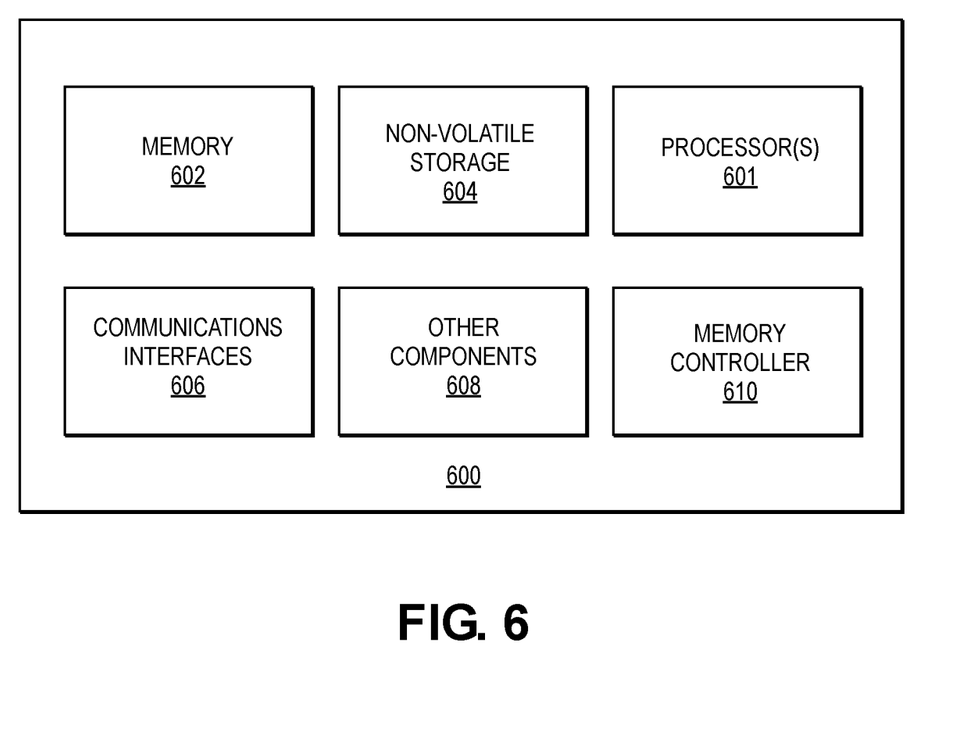
FIG. 6 provides an exemplary depiction of a computing system in which a probabilistic row hammer refresh scheme can be implemented.

FIG. 6 provides an exemplary depiction of a computing system in which a probabilistic row hammer refresh scheme can be implemented. The computing system 600 can be, for example, user equipment, a computer, a personal computer (PC), a desktop computer, a laptop computer, a notebook computer, a netbook computer, a tablet, a smart phone, embedded electronics, a gaming console, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. The system 600 may include a motherboard onto which components may be mounted. As observed in FIG. 6, the system 600 includes one or more processors or processing units 601 (e.g., host processor(s)). The processor(s) 601 may include one or more central processing units (CPUs), each of which may include, e.g., a plurality of general-purpose processing cores. The processor(s) 601 may also or alternatively include one or more graphics processing units (GPUs) or other processing units. The processor(s) 601 may include memory management logic (e.g., a memory controller 610) and I/O control logic. The memory controller 610 may include logic to implement a probabilistic row hammer refresh scheme, as described herein. The processor(s) 601 typically include cache on a same package or near the processor.

The system 600 also includes memory 602 (e.g., system memory). The system memory can be in the same package (e.g., same SoC) or separate from the processor(s) 601. The system 600 can include static random-access memory (SRAM), dynamic random-access memory (DRAM), or both. In some examples, memory 602 may include volatile types of memory including, but not limited to, RAM, D-RAM, DDR SDRAM, SRAM, T-RAM or Z-RAM. One example of volatile memory includes DRAM, or some variant such as SDRAM. In one example, the memory 602 includes a byte addressable DRAM or a byte addressable non-volatile memory such as a byte-addressable write-in-place three dimensional crosspoint memory device, or other byte addressable write-in-place non-volatile memory devices (also referred to as persistent memory), such as single or multi-level Phase Change Memory (PCM) or phase change memory with a switch (PCMS), NVM devices that use chalcogenide phase change material, resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

The system 600 also includes communications interfaces 606 and other components 608. The other components may include, for example, a display (e.g., touchscreen, flat-panel), a power supply (e.g., a battery or/or other power supply), sensors, power management logic, or other components. The communications interfaces 606 may include logic and/or features to support a communication interface. For these examples, communications interface 606 may include one or more input/output (I/O) interfaces that operate according to various communication protocols or standards to communicate over direct or network communication links or channels. Direct communications may occur via use of communication protocols or standards described in one or more industry standards (including progenies and variants). For example, I/O interfaces can be arranged as a Serial Advanced Technology Attachment (SATA) interface to couple elements of a node to a storage device. In another example, I/O interfaces can be arranged as a Serial Attached Small Computer System Interface (SCSI) (or simply SAS), Peripheral Component Interconnect Express (PCIe), or Non-Volatile Memory Express (NVMe) interface a storage device with other elements of a node (e.g., a controller, or other element of a node). Such communication protocols may be utilized to communicate through I/O interfaces as described in industry standards or specifications (including progenies or variants) such as the Peripheral Component Interconnect (PCI) Express Base Specification, revision 3.1, published in November 2014 ("PCI Express specification" or "PCIe specification") or later revisions, and/or the Non-Volatile Memory Express (NVMe) Specification, revision 1.2, also published in November 2014 ("NVMe specification") or later revisions. Network communications may occur via use of communication protocols or standards such those described in one or more Ethernet standards promulgated by IEEE. For example, one such Ethernet standard may include IEEE 802.3. Network communication may also occur according to one or more OpenFlow specifications such as the OpenFlow Switch Specification. Other examples of communications interfaces include, for example, a local wired point-to-point link (e.g., USB) interface, a wireless local area network (e.g., WiFi) interface, a wireless point-to-point link (e.g., Bluetooth) interface, a Global Positioning System interface, and/or other interfaces.

The computing system 600 also includes non-volatile storage 604, which may be the mass storage component of the system. Non-volatile types of memory may include byte or block addressable non-volatile memory such as, but not limited to, NAND flash memory (e.g., multi-threshold level NAND), NOR flash memory, single or multi-level phase change memory (PCM), resistive memory, nanowire memory, ferroelectric transistor random access memory (FeTRAM), magnetoresistive random access memory (MRAM) that incorporates memristor technology, spin transfer torque MRAM (STT-MRAM), 3-dimensional (3D) cross-point memory structure that includes chalcogenide and/or phase change material hereinafter referred to as "3D cross-point memory", or a combination of any of the above. For these examples, storage 604 may be arranged or configured as a solid-state drive (SSD). The data may be read and written in blocks and a mapping or location information for the blocks may be kept in memory 602.

The computing system 600 may also include one or more accelerators or other computing devices. For example, the computing system 600 may include an Artificial Intelligence (AI) or machine learning accelerator optimized for performing operations for machine learning algorithms, a graphics accelerator (e.g., GPU), or other type of accelerator. An accelerator can include processing circuitry (analog, digital, or both) and may also include memory within the same package as the accelerator.

Examples of probabilistic schemes for row hammer using temperature in victim address selection follow.

Example 1

A memory controller including input/output (I/O) interface circuitry to receive memory access requests from a processor and circuitry to shift an LFSR (linear feedback shift register) in response to receipt of a memory access request to a target address of a memory, compare a value in the LFSR with a pre-determined value, trigger a refresh to one or more neighboring addresses of the target address based on the comparison of the value in the LFSR and the pre-determined value, and reload the LFSR with one of multiple seeds based on a temperature.

Example 2

The memory controller of example 1, wherein the circuitry to reload the LFSR is to reload the LFSR based on a value indicative of a temperature of a memory module coupled with the memory controller.

Example 3

The memory controller of one of examples 1 and 2, wherein the circuitry to reload the LFSR is to reload the LFSR based on a value indicative a temperature of a DIMM (dual in-line memory module) coupled with the memory controller.

Example 4

The memory controller of one or examples 1, 2, and 3, wherein the circuitry to reload the LFSR is to reload the LFSR based on values indicative of temperatures of two or more DIMMs (dual in-line memory modules) coupled with the memory controller.

Example 5

The memory controller of one of examples 1, 2, 3, and 4, wherein the circuitry to reload the LFSR is to reload the LFSR based on an XOR of the values indicative of temperatures of two or more DIMMs coupled with the memory controller.

Example 6

The memory controller of one of examples 1, 2, 3, 4, and 5 wherein the circuitry to reload the LFSR is to reload the LFSR based on a value indicative of an on-die temperature of the memory controller.

Example 7

The memory controller of one of examples 1, 2, 3, 4, 5, and 6, wherein the circuitry to reload the LFSR is to reload the LFSR based on a value indicative of an on-die temperature of the memory controller and one or more values indicative of temperatures of DIMMs (dual in-line memory modules) coupled with the memory controller.

Example 8

The memory controller of one of examples 1, 2, 3, 4, 5, 6, and 7, wherein the circuitry to reload the LFSR is to reload the LFSR based on an XOR of the value indicative of the on-die temperature of the memory controller and the one or more values indicative of temperatures of coupled with the memory controller.

Example 9

The memory controller of one of examples 1, 2, 3, 4, 5, 6, 7, and 8, wherein the circuitry to reload the LFSR is to reload the LFSR based on an XOR of a value indicative of the temperature and one or more bits from the LFSR.

Example 10

The memory controller of one of examples 1, 2, 3, 4, 5, 6, 7, 8, and 9, wherein the temperature includes one or more of: a value indicative of an on-die temperature of the memory controller, and one or more values indicative of temperatures of one or more DIMMs coupled with the memory controller.

Example 11

The memory controller of examples 1, 2, 3, 4, 5, 6, 7, 8, 9, and 10 further including a counter circuit to trigger the reload of the LFSR with the one of multiple seeds based on the temperature at regular intervals.

Example 12

The memory controller of example 11, further including a programmable register to set an interval time of the counter circuit.

Example 13

The memory controller of one of examples 1-12, further including one or more programmable registers to store the multiple seeds.

Example 14

The memory controller of one of examples 1-13, further including a programmable register to select which of multiple temperature values to use for seed selection.

Example 15

The memory controller of one of examples 1-14, wherein the temperature includes one or more temperature values including one or more of: values indicative of multiple DIMM temperatures and an on-die temperature value.

Example 16

The memory controller of one of examples 1-15, wherein the circuitry to trigger the refresh is to trigger a refresh to the one or more neighboring addresses of the target address based on a determination that the value in the LFSR is equal to the pre-determined value.

Example 17

The memory controller of one of examples 1-16, wherein the circuitry is to update one or more values indicative of the temperature continuously or at regular intervals.

Example 18

A system including a processor, and a memory controller coupled with the processor. The memory controller includes input/output (I/O) interface circuitry to receive memory access requests from a processor, and circuitry to shift an LFSR (linear feedback shift register) in response to receipt of a memory access request to a target address, compare a value in the LFSR with a pre-determined value, trigger a refresh to one or more neighboring addresses of the target address based on the comparison of the value in the LFSR and the pre-determined value, and reload the LFSR with one of multiple seeds based on a temperature.

Example 19

The system of example 18, wherein the memory controller is in accordance with any of examples 2-17.

Example 20

The system of example 18, further including one or more of: the memory coupled with the memory controller, a display coupled with the processor, a network interface coupled with the processor, and a battery to power the system.

Example 21

A method performed in a memory controller, the method including shifting an LFSR (linear feedback shift register) in response to receipt of a memory access request to a target address, comparing a value in the LFSR with a pre-determined value, triggering a refresh to one or more neighboring addresses of the target address based on the comparison of the value in the LFSR and the pre-determined value, and reloading the LFSR with one of multiple seeds based on a temperature.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A memory controller comprising:
input/output (I/O) interface circuitry to receive memory access requests from a processor; and
circuitry to:
shift a linear feedback shift register (LFSR) in response to receipt of a memory access request to a target address of a memory,
compare a value in the LFSR with a pre-determined value,
trigger a refresh to one or more neighboring addresses of the target address based on the comparison of the value in the LFSR and the pre-determined value,
generate a select signal based on a further value from a register that is indicative of a temperature,
select a seed from multiple previously generated seeds based on the select signal, and
reload the LFSR with the seed selected based on the select signal.

2. The memory controller of claim 1, wherein:
the further value is indicative of the temperature of a memory module; and the circuitry is to generate the select signal is to generate the select signal based on the further value indicative of the temperature of the memory module.

3. The memory controller of claim 1, wherein:
the further value is indicative of the temperature of a dual in-line memory module (DIMM); and
the circuitry is to generate the select signal is to generate the select signal based on the further value indicative of the temperature of the DIMM.

4. The memory controller of claim 1, wherein:
the circuitry to generate the select signal is to generate the select signal based on a first value indicative of a first temperature of a first memory module and a second value indicative of a second temperature of a second memory module.

5. The memory controller of claim 4, wherein the circuitry to reload the LFSR is to:
reload the LFSR based on an XOR of values indicative of temperatures of two or more memory modules.

6. The memory controller of claim 1, wherein:
the further value is indicative of an on-die temperature of the memory controller; and
the circuitry is to generate the select signal is to generate the select signal based on the further value indicative of the on-die temperature of the memory controller.

7. The memory controller of claim 1, wherein:
the further value is indicative of an on-die temperature of the memory controller; and
the circuitry is to generate the select signal is to generate the select signal based on the further value indicative of the on-die temperature of the memory controller and further based on one or more values indicative of temperatures of dual in-line memory modules (DIMMs).

8. The memory controller of claim 7, wherein the circuitry to reload the LFSR is to:
reload the LFSR based on an XOR of the further value indicative of the on-die temperature of the memory controller and the one or more values indicative of the temperatures of the DIMMS coupled with the memory controller.

9. The memory controller of claim 1, wherein the circuitry to reload the LFSR is to:
reload the LFSR based on an XOR of the further value indicative of the temperature and one or more bits from the LFSR.

10. The memory controller of claim 9, wherein:
the temperature includes one or more of: a value indicative of an on-die temperature of the memory controller, and one or more values indicative of temperatures of one or more DIMMs coupled with the memory controller.

11. The memory controller of claim 1, further comprising:
a counter circuit to trigger the reload of the LFSR with the seed based on the select signal generated based on the further value indicative of the temperature at regular intervals.

12. The memory controller of claim 11, further comprising:
a programmable register to set an interval time of the counter circuit.

13. The memory controller of claim 1, further comprising:
one or more programmable registers to store the multiple previously generated seeds, wherein the circuitry to reload the LFSR is to reload the seed selected from the one or more programmable registers based on the select signal.

14. The memory controller of claim 1, further comprising:
a programmable register to select which of multiple temperature values to use for seed selection, wherein the multiple temperature values include two or more of: an on-die temperature of the memory controller, a first memory module temperature of a first memory module, and a second memory module temperature of a second memory module.

15. The memory controller of claim 1, wherein:
the temperature includes one or more temperature values including one or more of: values indicative of multiple DIMM temperatures and an on-die temperature value.

16. The memory controller of claim 1, wherein the circuitry to trigger the refresh is to:
trigger the refresh to the one or more neighboring addresses of the target address based on a determination that the value in the LFSR is equal to the pre-determined value.

17. The memory controller of claim 1, wherein the circuitry is to:
update one or more values indicative of the temperature continuously or at regular intervals.

18. A system comprising:
a processor; and
a memory controller coupled with the processor, the memory controller including:
input/output (I/O) interface circuitry to receive memory access requests from the processor; and
circuitry to:
shift a linear feedback shift register (LFSR) in response to receipt of a memory access request to a target address,
compare a value in the LFSR with a pre-determined value,
trigger a refresh to one or more neighboring addresses of the target address based on the comparison of the value in the LFSR and the pre-determined value, and
reload the LFSR with one of multiple seeds from a register based on a select signal, wherein the select signal is generated based on one or more values indicative of a temperature.

19. The system of claim 18, wherein the circuitry to reload the LFSR is to:
reload the LFSR with the one of the multiple seeds based the select signal that is generated based on one or more of: a further value indicative of an on-die temperature, and values indicative of temperatures of memory modules coupled with the memory controller.

20. The system of claim 18, further comprising one or more of:
memory coupled with the memory controller, a display coupled with the processor, a network interface coupled with the processor, and a battery to power the system.

21. A method performed in a memory controller, the method comprising:
shifting linear feedback shift register (LFSR) in response to receipt of a memory access request to a target address;
comparing a value in the LFSR with a pre-determined value;
triggering a refresh to one or more neighboring addresses of the target address based on the comparison of the value in the LFSR and the pre-determined value;
generating a select signal based on a temperature;
selecting a seed from multiple previously generated seeds based on the select signal; and reloading the LFSR with the seed based on the select signal generated based on the temperature.

22. The method of claim 21, wherein the temperature includes a temperature of a memory module coupled with the memory controller; and reloading the LFSR includes: reloading the LFSR with the seed based on the select signal generated based on a further value indicative of the temperature of the memory module coupled with the memory controller.

* * * * *